United States Patent
Holzapfel et al.

(10) Patent No.: US 9,748,557 B2
(45) Date of Patent: Aug. 29, 2017

(54) PHASE-PURE LITHIUM ALUMINIUM TITANIUM PHOSPHATE AND METHOD FOR ITS PRODUCTION AND ITS USE

(71) Applicant: Johnson Matthey PLC, London (GB)

(72) Inventors: Michael Holzapfel, Freising (DE); Max Eisgruber, Bruckberg (DE); Gerhard Nuspl, Munich (DE)

(73) Assignee: Johnson Matthey PLC, London (GB)

( * ) Notice: Subject to any disclaimer, the term of this patent is extended or adjusted under 35 U.S.C. 154(b) by 89 days.

(21) Appl. No.: 14/699,255

(22) Filed: Apr. 29, 2015

(65) Prior Publication Data

US 2015/0236339 A1      Aug. 20, 2015

Related U.S. Application Data

(62) Division of application No. 13/502,285, filed as application No. PCT/EP2010/006300 on Oct. 14, 2010, now abandoned.

(30) Foreign Application Priority Data

Oct. 16, 2009   (DE) .................. 10 2009 049 693

(51) Int. Cl.
| | |
|---|---|
| *H01M 6/20* | (2006.01) |
| *H01M 4/1397* | (2010.01) |
| *H01M 4/58* | (2010.01) |
| *H01M 4/136* | (2010.01) |
| *H01M 4/02* | (2006.01) |

(52) U.S. Cl.
CPC ......... *H01M 4/136* (2013.01); *H01M 4/5825* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 4,985,317 A | * | 1/1991 | Adachi ................. C01B 25/45 429/319 |
| 5,910,382 A | | 6/1999 | Goodenough et al. |
| 6,200,707 B1 | | 3/2001 | Takada et al. |
| 6,447,951 B1 | | 9/2002 | Barker et al. |

(Continued)

FOREIGN PATENT DOCUMENTS

| | | |
|---|---|---|
| CN | 1326595 A | 12/2001 |
| DE | 196 53 484 A1 | 6/1998 |
| EP | 1 570 113 B1 | 9/2005 |

(Continued)

OTHER PUBLICATIONS

Kosova et al, Lithium Titanium Phosphate as Cathode, Anode and Electrode for Lithium Rechargeable Batteries, 13 Chem. For Sustainable Dev. 253-260 (2005).*

(Continued)

*Primary Examiner* — Yoshitoshi Takeuchi
(74) *Attorney, Agent, or Firm* — Robert Lelkes (57) ABSTRACT

The present invention relates to a method for producing lithium aluminum titanium phosphates of the general formula $Li_{1+x}Ti_{2-x}Al_x(PO_4)_3$, wherein x is ≤0.4, a method for their production as well as their use as solid-state electrolytes in lithium ion accumulators.

15 Claims, 4 Drawing Sheets

(56) References Cited

U.S. PATENT DOCUMENTS

2007/0054187 A1* 3/2007 Nuspl .................. C01B 25/45
429/218.1
2007/0259271 A1 11/2007 Nanno et al.

FOREIGN PATENT DOCUMENTS

| | | |
|---|---|---|
| JP | 02-225310 | 9/1990 |
| JP | 2002-042876 A | 2/2002 |
| JP | 2002-151142 A | 5/2002 |
| JP | 2007-258165 A | 10/2007 |
| JP | 2008-243560 A | 10/2008 |
| JP | 2008-251219 A | 10/2008 |
| JP | 2009-181807 A | 8/2009 |
| JP | 2009-193802 A | 8/2009 |
| KR | 10-2005-0030763 | 3/2005 |
| KR | 10-2009-0015131 | 2/2009 |
| WO | WO 2006/064774 | 6/2006 |

OTHER PUBLICATIONS

Aono et al., *Ionic Conductivity of Solid Electrolytes Based on Lithium Titanium Phosphate*, J. Electrochem. Soc., 137:1023-1027 (2009).

Aono et al., *Ionic Conductivity of the Lithium Titanium Phosphate ($Li_{1+x}M_xTi_{2-x}(PO_4)_3$, $M=Al$, $Sc$, $Y$, and $La$) Systems*, J. Electrochem, Soc., 136:590-591 (1989).

Arbi et al., *Dependence of Ionic Conductivity on Composition of Fast Ionic Conductors $Li_{1+x}Al_x(PO_4)_3$, $0 \leq 0.7$. A Parallel NMR and Electric Impedance Study*, Chem. Mater., 14:1091-1097 (2002).

Arbi et al., *Lithium Mobility in $Li_{1.2}Ti_{1.8}R_{0.2}(PO_4)_3$ Compounds ($R=Al$, $Ga$, $Sc$, $In$) as Followed by NMR and Impedance Spectroscopy*, Chem, Mater., 16:255-262 (2004).

Cretin et al., *Study of $Li_{1+x}(PO_4)_3$ for $Li^+$ Potentiometric Sensors*, Journal of the European Ceramic Society 15:1149-1156 (1995).

International Search Report. PCT/EP2010/006300 dated Jan. 20, 2011.

Japanese Office Action for Application No. 2012-533528 dated Nov. 18, 2014.

Kosova et al., *Lithium Titanium Phosphate as Cathode, Anode and Electrolyte for Lithium Rechargeable Batteries*, Chemistry for sustainable Development, 13:253-260 (2005).

Kosova, N.V., et al., "Lithium Conductivity and Lithium Diffusion in NASICON-type $Li_{1+x}Ti_{2-x}Al_x(PO_4)_3$ (x=0;03) Prepared by Mechanical Activation," The Science and Technology of Ionics, Jan. 15, 200B. pp. 303-311. vol. 14.

Nuspl et al., *Lithium ion migration pathways in $LiTi_2(PO_4)_3$ and related materials*, Journal of Applied Physics 86:5484-5491 (1999).

Wu et al., *Synthesis of $Li_{1.3}Al_{0.3}Ti_{1.7}(PO_4)_3$ by sol-gel technique*, Materials Letters 58:1227-1230 (2003).

Xu et al., "Dense nanostructured solid electrolyte with high Li-ion conductivity by spark plasma sintering technique", Materials Research Bulletin 43 (2008) pp. 2334-2341.

* cited by examiner

PHASE-PURE LITHIUM ALUMINIUM TITANIUM PHOSPHATE AND METHOD FOR ITS PRODUCTION AND ITS USE

CROSS-REFERENCE TO RELATED APPLICATIONS

This application is a divisional of U.S. application Ser. No. 13/502,285, filed Aug. 3, 2012, which is a U.S. National Stage application claiming benefit of International Application No. PCT/EP2010/006300, filed Oct. 14, 2010, and claiming benefit of German Application No. DE 10 2009 049 693.9, filed Oct. 16, 2009. The entire disclosures of both PCT/EP2010/006300 and DE 10 2009 049 693.9 are incorporated herein by reference.

BACKGROUND

The present invention relates to phase-pure lithium aluminium titanium phosphate, a method for its production, its use, as well as a secondary lithium ion battery containing the phase-pure lithium aluminium titanium phosphate.

Recently, battery-powered motor vehicles have increasingly become the focal point of research and development because of the increasing lack of fossil raw materials in the near future.

In particular lithium ion accumulators (also called secondary lithium ion batteries) proved to be the most promising battery models for such applications.

These so-called "lithium ion batteries" are also widely used in fields such as power tools, computers, mobile telephones etc. In particular the cathodes and electrolytes, but also the anodes, consist of lithium-containing materials.

$LiMn_2O_4$ and $LiCoO_2$ for example have been used for some time as cathode materials. Recently, in particular since the work of Goodenough et al, (U.S. Pat. No. 5,910,382), also doped or non-doped mixed lithium transition metal phosphates, in particular $LiFePO_4$.

Normally, for example graphite or also, as already mentioned above, lithium compounds such as lithium titanates are used as anode materials in particular for large-capacity batteries.

By lithium titanates are meant here the doped or non-doped lithium titanium spinels of the $Li_{1+x}Ti_{2-x}O_4$ type with $0 \leq x \leq 1/3$ of the space group Fd3m and all mixed titanium oxides of the generic formula $Li_xTi_yO (0 \leq x,y \leq 1)$.

Normally, lithium salts or their solutions are used for the electrolyte in such lithium ion accumulators.

Ceramic separators such as Separion® commercially available in the meantime for example from Evonik Degussa (DE 196 53 484 A1) have also been proposed. However, Separion contains, not a solid-state electrolyte, but ceramic fillers such as nanoscale $Al_2O_3$ and $SiO_2$.

Lithium titanium phosphates have for some time been mentioned as solid electrolytes (JP A 1990 2-225310). Lithium titanium phosphates have, depending on the structure and doping, an increased lithium ion conductivity and a low electrical conductivity, which, also in addition to their hardness, makes them very suitable as solid electrolytes in secondary lithium ion batteries.

Aono et al. have described the ionic (lithium) conductivity of doped and non-doped lithium titanium phosphates (J. Electrochem. Soc., Vol. 137, No. 4, 1990, pp. 1023-1027, J. Electrochem. Soc., Vol. 136, No. 2, 1989, pp. 590-591).

Systems doped with aluminium, scandium, yttrium and lanthanum in particular were examined. It was found that in particular doping with aluminium delivers good results because, depending on the degree of doping, aluminium brings about the highest lithium ion conductivity compared with other doping metals and, because of its cation radius (smaller than $Ti^{4+}$) in the crystal, it can well take the spaces occupied by the titanium.

Kosova et al. in Chemistry for Sustainable Development 13 (2005) 253-260 propose suitable doped lithium titanium phosphates as cathodes, anodes and electrolytes for rechargeable lithium ion batteries.

$Li_{1.3}Al_{0.3}Ti_{1.7}(PO_4)$ was proposed in EP 1 570 113 B1 as ceramic filler in an "active" separator film which has additional lithium ion conductivity for electrochemical components.

Likewise, further doped lithium titanium phosphates, in particular doped with iron, aluminium and rare earths, were described in U.S. Pat. No. 4,985,317.

However, very expensive production by means of solid-state synthesis starting from solid phosphates, in which the obtained lithium titanium phosphate is normally contaminated by further foreign phases such as for example $AlPO_4$ or $TiP_2O_7$, is common to all of the above-named lithium titanium phosphates. Phase-pure lithium titanium phosphate or phase-pure doped lithium titanium phosphate has been unknown thus far.

SUMMARY

The object of the present invention was therefore to provide phase-pure lithium aluminium titanium phosphate, because this combines the characteristics of a high lithium ion conductivity with a low electrical conductivity. In particular, phase-pure lithium aluminium titanium phosphate should have an even better ionic conductivity compared with lithium aluminium titanium phosphate of the state of the art because of the absence of foreign phases.

This object is achieved by the provision of phase-pure lithium aluminium titanium phosphate of the formula $Li_{1+x}Ti_{2-x}Al_x(PO_4)_3$, wherein x is $\leq 0.4$ and the level of magnetic metals and metal compounds of the elements Fe, Cr and Ni therein is $\leq 1$ ppm.

DETAILED DESCRIPTION

Here, by the term "phase-pure" is meant that reflexes of foreign phases cannot be recognized in the X-ray powder diffractogram (XRD). The absence of foreign-phase reflexes in the lithium aluminium titanium phosphate according to the invention, as is shown by way of example in FIG. 2 below, corresponds to a maximum proportion of foreign phases, such as e.g. $AlPO_4$ and $TiP_2O_7$, of 1%.

Foreign phases reduce the intrinsic ion conductivity, with the result that, compared with those of the state of the art, all of which contain foreign phases, the phase-pure lithium aluminium titanium phosphates according to the invention have a higher intrinsic conductivity than the lithium aluminium titanium phosphates of the state of the art.

Surprisingly, it was also found that the total level of magnetic metals and metal compounds of Fe, Cr and Ni (ΣFe+Cr+Ni) in the lithium aluminium titanium phosphate according to the invention is 1 ppm. In the case of lithium aluminium phosphates of the state of the art (obtained according to JP A 1990-2-225310) this value is normally between 2 and 3 ppm. When account is also taken of any disruptive zinc, the total content Σ Fe+Cr+Ni+Zn=1.1 ppm in the lithium aluminium titanium phosphate according to the invention, compared with 2.3-3.3 ppm of a lithium aluminium titanium phosphate according to the above-named state of the art.

In particular, the lithium aluminium titanium phosphate according to the invention displays only an extremely small contamination by metallic or magnetic iron and magnetic iron compounds (such as e.g. $Fe_3O_4$) of <0.5 ppm. The determination of the concentrations of magnetic metals or metal compounds is described in detail below in the experimental section. Customary values for magnetic iron or magnetic iron compounds in the lithium aluminium titanium phosphates previously known from the state of the art are approx. 1-1000 ppm. The result of contamination by metallic iron or magnetic iron compounds is that in addition to the formation of dendrites associated with a drop in current the danger of short circuits within an electrochemical cell in which lithium aluminium titanium phosphate is used as solid electrolyte increases significantly and thus represents a risk for the production of such cells on an industrial scale. This disadvantage can be avoided with the phase-pure lithium aluminium titanium phosphate here.

Surprisingly, the phase-pure lithium aluminium titanium phosphate according to the invention also has a relatively high BET surface area of <4.5 $m^2$/g. Typical values are for example 2.0 to 3.5 $m^2$/g. Lithium aluminium titanium phosphates known from the literature on the other hand have BET surface areas of less than 1.5 $m^2$/g.

The lithium aluminium titanium phosphate according to the invention preferably has a particle-size distribution of $d_{90}$<6 µm, $d_{50}$<2.1 µm and $d_{10}$<1 µm, which results in the majority of the particles being particularly small and thus a particularly high ion conductivity being achieved. This confirms similar findings from the above-mentioned Japanese unexamined patent application, where it was also attempted to obtain smaller particle sizes by means of various grinding processes. Because of the extreme hardness of the lithium aluminium titanium phosphate (Mohs' hardness>7, i.e. close to diamond), this is difficult to obtain with customary grinding processes, however.

In further preferred embodiments of the present invention, the lithium aluminium titanium phosphate has the following empirical formulae: $Li_{1.2}Ti_{1.8}Al_{0.2}(PO_4)_3$, which has a very good total ion conductivity of approx. $5 \times 10^{-4}$ S/cm at 293 K and—in the particularly phase-pure form—$Li_{1.3}Ti_{1.7}Al_{0.3}(PO_4)_3$, which has a particularly high total ion conductivity of $7 \times 10^{-4}$ S/cm at 293 K.

The object of the present invention was furthermore to provide a method for producing the phase-pure lithium aluminium titanium phosphate according to the invention. This object is achieved by a method which comprises the following steps:
a) providing a concentrated phosphoric acid,
b) adding a mixture of a lithium compound, titanium dioxide and an oxygen-containing aluminium compound,
c) heating the mixture in order to obtain a solid intermediate product,
d) calcining the solid intermediate product.

Surprisingly it was found that, unlike all previously known syntheses of the state of the art, a liquid phosphoric acid can also be used instead of solid phosphoric acid salts. The method according to the invention thus proceeds as a defined precipitation of an aqueous precursor suspension. The use of a phosphoric acid makes possible a simpler execution of the method and thus also the option of removing impurities already in solution or suspension and thus also obtaining products with greater phase purity.

A concentrated phosphoric acid, i.e. for example 85% orthophosphoric acid, is preferably used as phosphoric acid, although in less preferred further embodiments of the present invention other concentrated phosphoric acids can also be used, such as for example metaphosphoric acid etc. All condensation products of orthophosphoric acid can also be used according to the invention such as: catenary polyphosphoric acids (diphosphoric acid, triphosphoric acid, oligophosphoric acids, etc.) annular metaphosphoric acids (tri-, tetrametaphosphoric acid) up to the anhydride of phosphoric acid $P_2O_5$ (in water).

According to the invention any suitable lithium compound can be used as lithium compound, such as $Li_2CO_3$, LiOH, $Li_2O$, $LiNO_3$, wherein lithium carbonate is particularly preferred because it is the most cost-favourable source of raw material.

Practically any oxide or hydroxide or mixed oxide/hydroxide of aluminium can be used as oxygen-containing aluminium compound. Aluminium oxide $Al_2O_3$ is preferably used in the state of the art because of its ready availability. In the present case it was found, however, that the best results are achieved with $Al(OH)_3$. $Al(OH)_3$ is even more cost-favourable compared with $Al_2O_3$ and also more reactive than $Al_2O_3$, in particular in the calcining step. Of course, $Al_2O_3$ can also be used in the method according to the invention, albeit less preferably; however, the calcining in particular then lasts longer compared with using $Al(OH)_3$.

The step of heating the mixture is carried out at a temperature of from 200 to 300° C., preferably 200 to 260° C. and quite particularly preferably of from 200 to 240° C. A gentle reaction which moreover can still be controlled is thereby guaranteed.

The calcining takes place preferably at temperatures of from 830-1000° C., quite particularly preferably at 880-900° C., as below 830° C. the danger of the occurrence of foreign phases is particularly great.

Typically, the vapour pressure of the lithium in the compound $Li_{1+x}Ti_{2-x}Al_x(PO_4)_3$ increases at temperatures >950° C., i.e. at temperatures >950° C. the formed compounds $Li_{1+x}Ti_{2-x}Al_x(PO_4)_3$ lose more and more lithium which settles as $Li_2O$ and $Li_2CO_3$ on the oven walls in an air atmosphere. This can be compensated for e.g. by the lithium excess described below, but the precise setting of the stoichiometry becomes more difficult. Therefore, lower temperatures are preferred and surprisingly also possible by the previous execution of the method compared with the state of the art. This result can be attributed to the use of aqueous concentrated phosphoric acid compared with solid phosphates of the state of the art.

Moreover, temperatures >1000° C. make greater demands of the oven and crucible material.

The calcining is carried out over a period of from 5 to 10 hours. In further even more preferred embodiments of the present invention, a second calcining step is carried out at the same temperature and preferably for the same period, whereby a particularly phase-pure product is obtained.

In other preferred developments of the present invention, a stoichiometric excess of the lithium compound is used in step b). Lithium compounds are, as already said above, often volatile at the reaction temperatures used, with the result that, depending on the lithium compound, work must here often be carried out with an excess. Here, preferably a stoichiometric excess of approx. 8% is then used which represents a reduction in quantity of expensive lithium compound of approx. 50% compared with the solid-state methods of the state of the art. Moreover, because the method is carried out via an aqueous precipitation process, monitoring of the stoichiometry is made particularly easy compared with a solid-state method.

The subject of the present invention is also a phase-pure lithium aluminium titanium phosphate of the formula $Li_{1-x}Ti_{2-x}Al_x(PO_4)_3$ wherein x is ≤0.4, which can be obtained by the method according to the invention and can be obtained particularly phase-pure within the meaning of the above definition by the execution of the method, and contains small quantities of ≤1 ppm of magnetic impurities, as already described above. Also, all previously known products obtainable by solid-state synthesis methods—as already said above—had further foreign phases in addition to increased quantities of disruptive magnetic compounds, something which can be avoided here by executing the method according to the invention in particular by using an (aqueous) concentrated phosphoric acid instead of solid phosphates.

The subject of the invention is also the use of the phase-pure lithium aluminium titanium phosphate according to the invention as solid electrolyte in a secondary lithium ion battery.

The object of the invention is further achieved by providing an improved secondary lithium ion battery which contains the phase-pure lithium aluminium titanium phosphate according to the invention, in particular as solid electrolyte. Because of its high lithium ion conductivity, the solid electrolyte is particularly suitable and particularly stable and also resistant to short circuits because of its phase purity and low iron content.

In preferred developments of the present invention, the cathode of the secondary lithium ion battery according to the invention contains a doped or non-doped lithium transition metal phosphate as cathode, wherein the transition metal of the lithium transition metal phosphate is selected from Fe, Co, Ni, Mn, Cr and Cu. Doped or non-doped lithium iron phosphate $LiFePO_4$ is particularly preferred.

In yet further preferred developments of the present invention, the cathode material additionally contains a doped or non-doped mixed lithium transition metal oxo compound different from the lithium transition metal phosphate used. Lithium transition metal oxo compounds suitable according to the invention are e.g. $LiMn_2O_4$, $LiNiO_2$, $LiCoO_2$, NCA ($LiNi_{1-x-y}Co_xAl_yO_2$, e.g. $LiNi_{0.8}Co_{0.15}Al_{0.05}O_2$) or NCM ($LiNi_{1/3}Co_{1/3}Mn_{1/3}O_2$). The proportion of lithium transition metal phosphate in such a combination lies in the range of from 1 to 60 wt.-%. Preferred proportions are e.g., 6-25 wt.-%, preferably 8-12 wt.-% in an $LiCoO_2/LiFePO_4$ mixture and 25-60 wt.-% in an $LiNiO_2/LiFePO_4$ mixture.

In yet further preferred developments of the present invention, the anode material of the secondary lithium ion battery according to the invention contains a doped or non-doped lithium titanate. In less preferred developments the anode material contains exclusively carbon, for example graphite etc. The lithium titanate in the preferred development mentioned above is typically doped or non-doped $Li_4Ti_5O_{12}$, with the result that for example a potential of 2 volts vis-à-vis the preferred cathode of doped or non-doped lithium transition metal phosphate can be achieved.

As already stated above, both the lithium transition metal phosphates of the cathode material as well as the lithium titanates of the anode material of the preferred development are either doped or non-doped. Doping takes place with at least one further metal or also with several, which leads in particular to an increased stability and cycle stability of the doped materials when used as cathode or anode. Metal ions such as Al, B, Mg, Ga, Fe, Co, Sc, Y, Mn, Ni, Cr, V, Sb, Bi, Nb or several of these ions, which can be incorporated in the lattice structure of the cathode or anode material, are preferred as doping material. Mg, Nb and Al are quite particularly preferred. The lithium titanates are normally preferably rutile-free and thus equally phase-pure.

The doping metal cations are present in the above-named lithium transition metal phosphates or lithium titanates in a quantity of from 0.05 to 3 wt.-%, preferably 1 to 3 wt.-% relative to the total mixed lithium transition metal phosphate or lithium titanate. Relative to the transition metal (values in at %) or in the case of lithium titanates, relative to lithium and/or titanium, the quantity of doping metal cation(s) is 20 at %, preferably 5-10 at %.

The doping metal cations occupy either the lattice positions of the metal or of the lithium. Exceptions to this are mixed Fe, Co, Mn, Ni, Cr, Cu, lithium transition metal phosphates which contain at least two of the above-named elements, in which larger quantities of doping metal cations may also be present, in the extreme case up to 50 wt.-%.

Typical further constituents of an electrode of the secondary lithium ion battery according to the invention are, in addition to the active material, i.e. the lithium transition metal phosphate or the lithium titanate, carbon blacks as well as a binder.

Binders known per se to a person skilled in the art may be used here as binder, such as for example polytetrafluoroethylene (PTFE), polyvinylidene difluoride (PVDF), polyvinylidene difluoride hexafluoropropylene copolymers (PVDF-HFP), ethylene-propylene-diene terpolymers (EPDM), tetrafluoroethylene hexafluoropropylene copolymers, polyethylene oxides (PEO), polyacrylonitriles (PAN), polyacryl methacrylates (PMMA), carboxymethylcelluloses (CMC), and derivatives and mixtures thereof.

Within the framework of the present invention, typical proportions of the individual constituents of the electrode material are preferably 80 to 98 parts by weight active material electrode material, 10 to 1 parts by weight conductive carbon and 10 to 1 parts by weight binder.

Within the framework of the present invention, preferred cathode/solid electrolyte/anode combinations are for example $LiFePO_4/Li_{1.3}Ti_{1.7}Al_{0.3}(PO_4)_3/Li_xTi_yO$ with a single-cell voltage of approx. 2 volts which is well suited as substitute for lead-acid cells or $LiCo_zMn_yFe_xPO_4/Li_{1.3}Ti_{1.7}Al_{0.3}(PO_4)_3/Li_xTi_yO$, wherein x, y and z are as defined further above, with increased cell voltage and improved energy density.

BRIEF DESCRIPTION OF THE DRAWINGS

The invention is explained in more detail below with the help of drawings and examples which are not to be understood as limiting the scope of the present invention. There are shown in.

1. MEASUREMENT METHODS

The BET surface area was determined according to DIN 66131 (DIN-ISO 9277),

The particle-size distribution was determined according to DIN 66133 by means of laser granulometry with a Malvern Mastersizer 2000.

The X-ray powder diffractogram (XRD) was measured with an X'Pert PRO diffractometer, PANalytical: Goniometer Theta/Theta, Cu anode PW 3376 (max. output 2.2 kW), detector X'Celerator, X'Pert Software.

The level of magnetic constituents in the lithium aluminium titanium phosphate according to the invention is determined by separation by means of magnets followed by decomposition by acid and subsequent ICP analysis of the formed solution.

The lithium aluminium titanium phosphate powder to be examined is suspended in ethanol with a magnet of a specific size (diameter 1.7 cm, length 5.5 cm<6000 Gauss). The ethanolic suspension is exposed to the magnet in an ultrasound bath with a frequency of 135 kHz for 30 minutes. The magnet attracts the magnetic particles from the suspension or the powder. The magnet with the magnetic particles is then removed from the suspension. The magnetic impurities are dissolved with the help of decomposition by acid and this is examined by means of ICP (ion chromatography) analysis, in order to determine the precise quantity as well as the composition of the magnetic impurities. The apparatus for ICP analysis was an ICP-EDS, Varian Vista Pro 720-ES.

Example 1

Production of $Li_{1.3}Al_{0.3}Ti_{1.7}(PO_4)_3$ 1037.7 g orthophosphoric acid (85%) was introduced into a reaction vessel, A mixture of 144.3 g $Li_2CO_3$, 431.5 g $TiO_2$ (in anatase form) and 46.8 g $Al(OH)_3$ (Gibbsite) was added slowly via a fluid channel accompanied by vigorous stirring with a Teflon-coated anchor stirrer. As the $Li_2CO_3$ with the phosphoric acid reacted off accompanied by strong foaming of the suspension because of the formation of $CO_2$, the admixture was added very slowly over a period of from 1 to 1.5 hours. Towards the end of the addition, the white suspension became more viscous but remained capable of forming drops.

The mixture was then heated to 225° C. in an oven and left at this temperature for two hours. A hard, friable crude product, only partly removable from the reaction vessel with difficulty, forms. The complete solidification of the suspension from liquid state via a rubbery consistency took place relatively quickly. However, e.g. a sand or oil bath can also be used instead of an oven.

The crude product was then finely ground over a period of 6 hours in order to obtain a particle size of <50 μm.

The finely ground premixture was heated from 200 to 900° C. within six hours at a heat-up rate of 2° C. per minute, as otherwise crystalline foreign phases were detectable in the X-ray powder diffractogram (XRD). The product was then sintered at 900° C. for 24 hours and then finely ground in a ball mill with porcelain spheres. The total quantity of magnetic Fe, Cr and Ni or their magnetic compounds was 0.75 ppm. The total quantity of Fe and its magnetic compounds was 0.25 ppm.

Example 2

$Li_{1.3}Al_{0.3}Ti_{1.7}(PO_4)_3$ was synthesized as in Example 1, but after the end of the addition of the mixture of lithium carbonate, $TiO_2$ and $Al(OH)_3$, the white suspension was transferred into a vessel with anti-adhesion coating, for example into a vessel with Teflon walls. The removal of the cured intermediate product was thereby greatly simplified compared with Example 1. The analysis data corresponded to those of Example 1.

Example 3

$Li_{1.3}Al_{0.3}Ti_{1.7}(PO_4)_3$ was synthesized as in Example 2, except that the ground intermediate product was also pressed into pellets before the sintering. The analysis data corresponded to those of Example 1.

Example 4

$Li_{1.3}Al_{0.3}Ti_{1.7}(PO_4)_3$ was synthesized as in Example 2 or 3, except that both with the pellets and with the finely ground intermediate product, a first calcining was carried out over 12 hours after cooling to room temperature followed by a second calcining over a further 12 hours at 900° C. In the case of the latter, no signs of foreign phases were found in the product. The total quantity of magnetic Fe, Cr and Ni or their magnetic compounds was 0.76 ppm. The quantity of Fe and its magnetic compound was 0.24 ppm. A comparison example produced according to JP A 1990 2-225310 showed, on the other hand, a quantity Σ of Fe, Cr, Ni of 2.79 ppm and of magnetic iron or iron compounds of 1.52 ppm.

Figure 1:
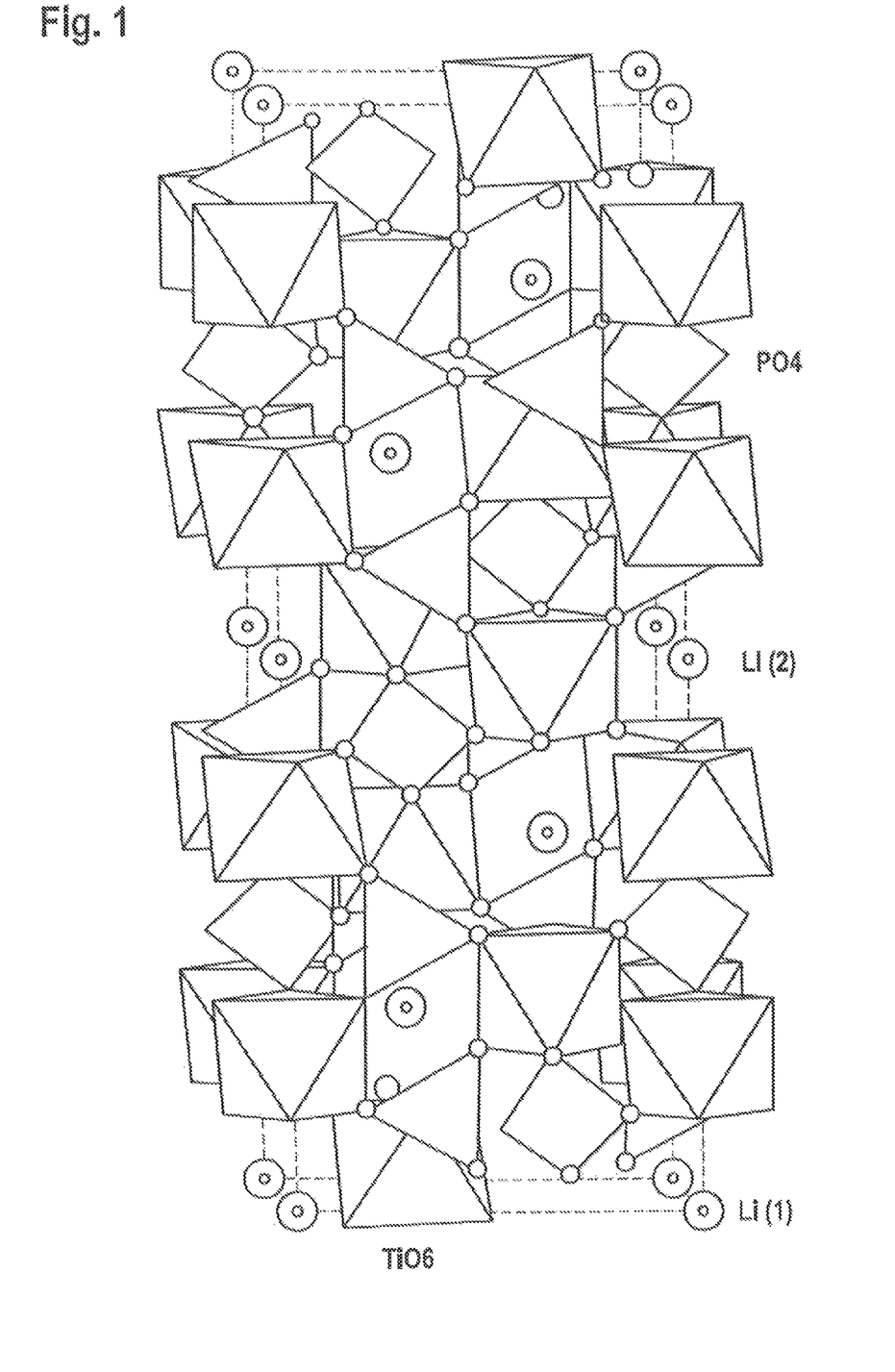
FIG. 1 the structure of the phase-pure lithium aluminium titanium phosphate according to the invention, FIG. 2 an X-ray powder diffractogram (XRD) of a lithium aluminium titanium phosphate according to the invention, FIG. 3 an X-ray powder diffractogram (XRD) of a conventionally produced lithium aluminium titanium phosphate, FIG. 4 the particle-size distribution of the lithium aluminium titanium phosphate according to the invention.

The structure of the product $Li_{1.3}Al_{0.3}Ti_{1.7}(PO_4)_3$ obtained according to the invention is shown in FIG. 1 and is similar to a so-called NASiCON ($Na^+$ superionic conductor) structure (see Nuspl et al, J. Appl. Phys. Vol. 06, No, 10, p. 5484 et seq. (1999)).

The three-dimensional $Li^+$ channels of the crystal structure and a simultaneously very low activation energy of 0.30 eV for the Li migration in these channels bring about a high intrinsic Li ion conductivity. The Al doping scarcely influences this intrinsic $Li^+$ conductivity, but reduces the Li ion conductivity at the particle boundaries.

In addition to $Li_{3x}La_{2/3-x}TiO_3$ compounds, $Li_{1.3}Al_{0.3}Ti_{1.7}(PO_4)_3$ is the solid-state electrolyte with the highest $Li^+$ ion conductivity known in literature.

Figure 2:
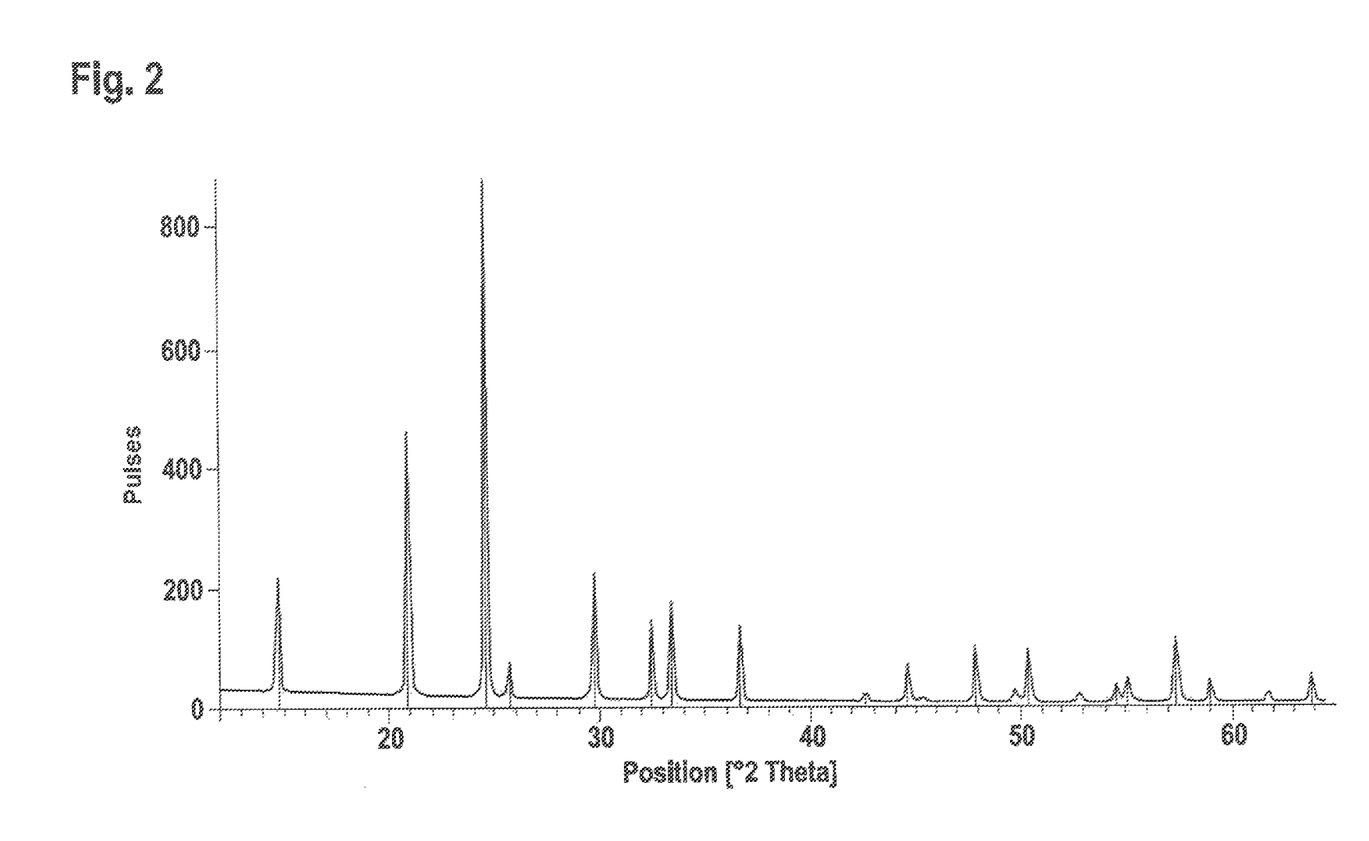

As can be seen from the X-ray powder diffractogram (XRD) of the product from Example 4 in FIG. 2, particularly phase-pure products result from the reaction process according to the invention.

Figure 3:
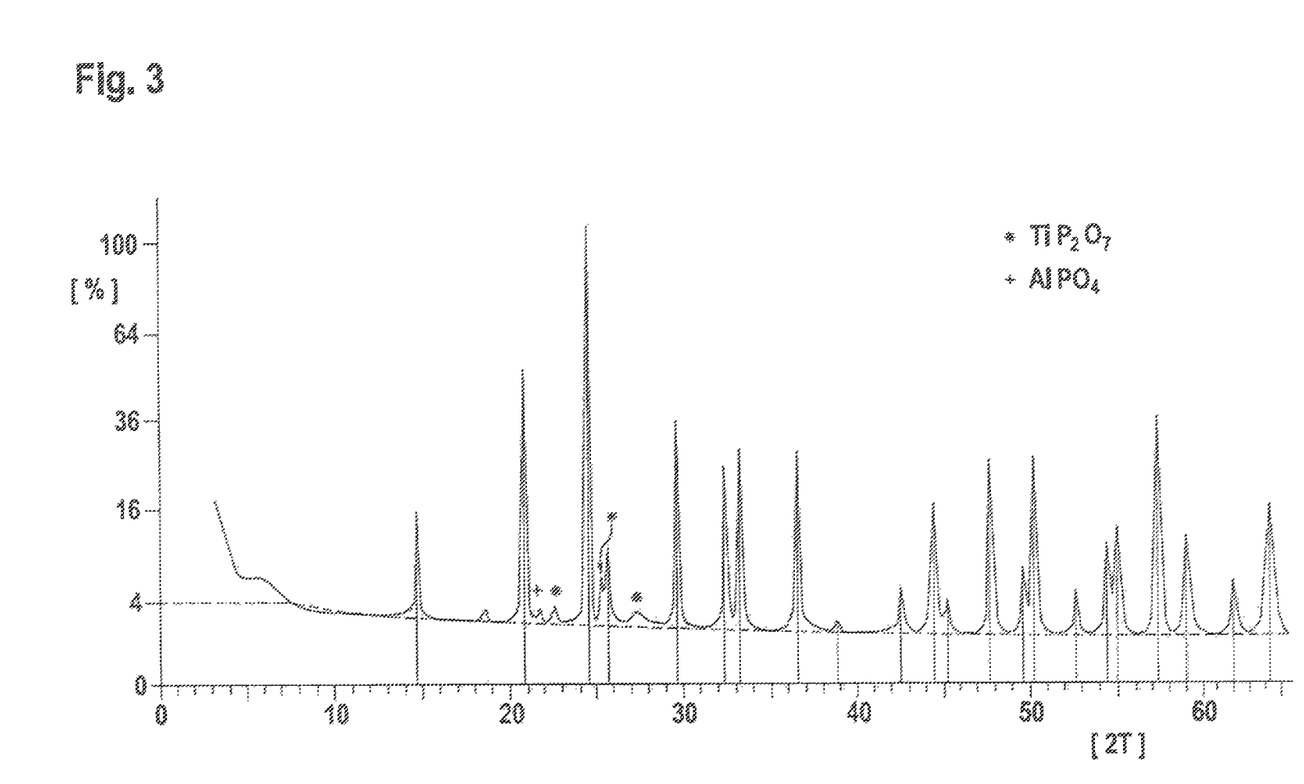

FIG. 3 shows, in comparison to this, an X-ray powder diffractogram of a lithium aluminium titanium phosphate of the state of the art produced according to JP A 1990 2-225310 with foreign phases such as $TiP_2O_7$ and $AlPO_4$. The same foreign phases are also found in the material described by Kosova et al. (see above).

Figure 4:
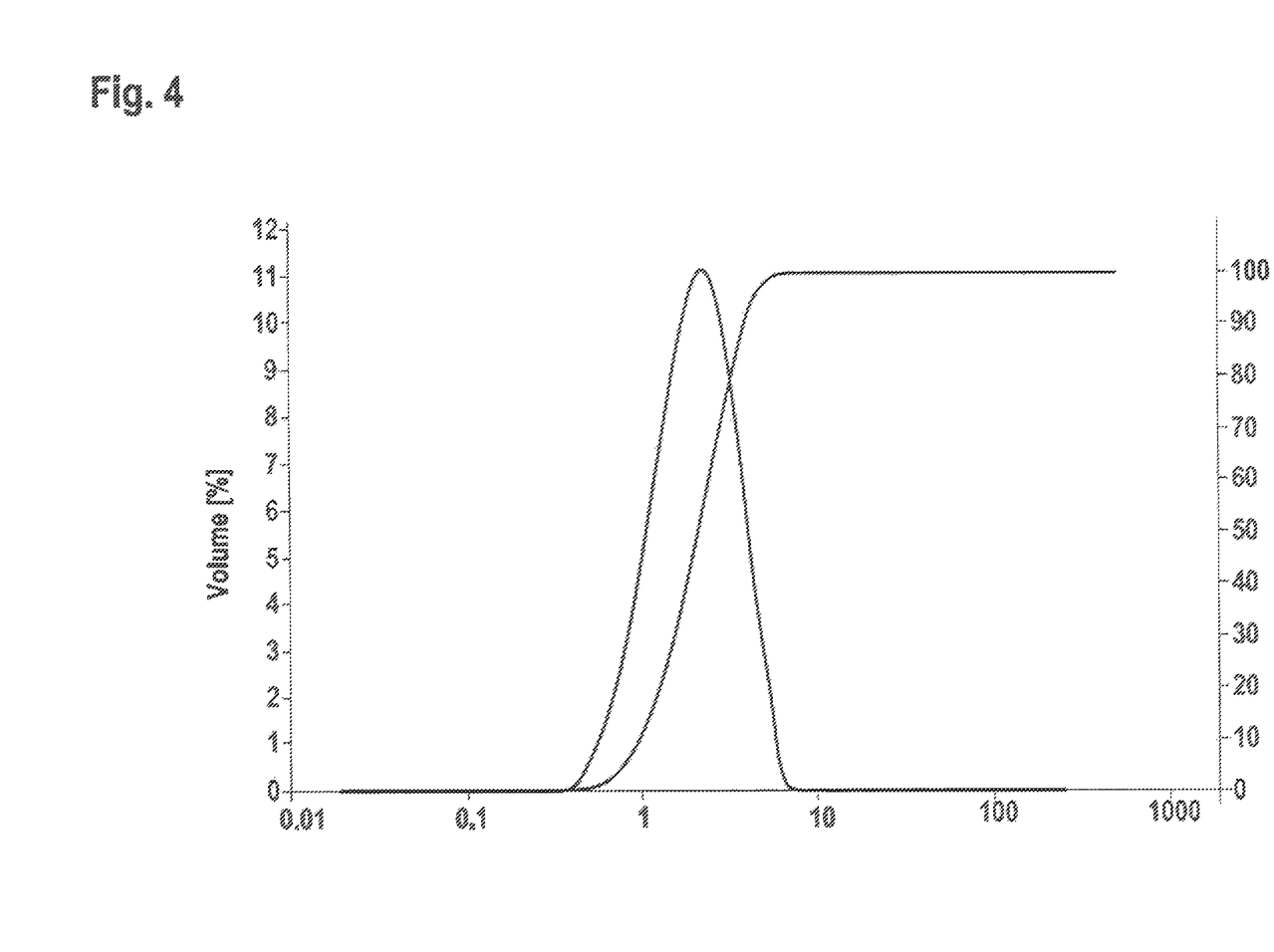

The particle-size distribution of the product from Example 4 is shown in FIG. 4 which has a purely monomodal particle-size distribution with values for $d_{90}$ of <6 μm, $d_{50}$ of <2.1 μm and $d_{10}$<1 μm.

What is claimed:
1. A method for producing a phase-pure lithium aluminum titanium phosphate of the formula $Li_{1+x}Ti_{2-x}Al_x(PO_4)_3$ comprising the steps of:
   a) providing an aqueous liquid phosphoric acid,
   b) adding a mixture of a lithium compound, titanium dioxide and an oxygen-containing aluminum compound to the aqueous phosphoric acid of step a),
   c) heating the mixture of step b) in order to obtain a solid intermediate product, and d) calcining the solid intermediate product of step c), wherein x is ≤0.4 and >0, and the concentration of magnetic metals and magnetic metal compounds of the elements Fe, Cr and Ni in the phase-pure lithium aluminum titanium phosphate is ≤1 ppm.

2. The method according to claim 1, wherein the aqueous liquid phosphoric acid is aqueous liquid orthophosphoric acid.

3. The method according to claim 1, wherein lithium carbonate is used as lithium compound.

4. The method according to claim 1, wherein $Al(OH)_3$ is used as oxygen-containing aluminum compound.

5. The method according to claim 1, wherein the step of heating is carried out at a temperature of from 200 to 300° C.

6. The method according to claim 5, wherein the calcining takes place at a temperature in the range from 850° C. to 1000° C.

7. The method according to claim 6, wherein the calcining is carried out over a period of from 5 to 24 hours.

8. The method according to claim 1, wherein a stoichiometric excess of lithium compound is used in step b).

9. A method for producing a phase-pure lithium aluminum titanium phosphate of the formula $Li_{1+x}Ti_{2-x}Al_x(PO_4)_3$ comprising the steps of:

a) providing 85% orthophosphoric acid,
b) adding a mixture of a lithium compound, titanium dioxide and an oxygen-containing aluminum compound to the 85% orthophosphoric acid of step a),
c) heating the mixture of step b) in order to obtain a solid intermediate product, and
d) calcining the solid intermediate product of step c), wherein x is ≤0.4 and >0, and the concentration of magnetic metals and magnetic metal compounds of the elements Fe, Cr and Ni in the phase-pure lithium aluminum titanium phosphate is ≤1 ppm.

10. The method according to claim 9, wherein lithium carbonate is used as lithium compound.

11. The method according to claim 9, wherein $Al(OH)_3$ is used as oxygen-containing aluminum compound.

12. The method according to claim 9, wherein the step of heating is carried out at a temperature of from 200 to 300° C.

13. The method according to claim 12, wherein the calcining takes place at a temperature in the range from 850° C. to 1000° C.

14. The method according to claim 13, wherein the calcining is carried out over a period of from 5 to 24 hours.

15. The method according to claim 9, wherein a stoichiometric excess of lithium compound is used in step b).

* * * * *